United States Patent Office

3,023,236
Patented Feb. 27, 1962

3,023,236
RECOVERY OF GLUTAMIC ACID
Harold L. Fike, Chicago, Ill., assignor to International Minerals & Chemical Corporation, a corporation of New York
No Drawing. Filed June 13, 1958, Ser. No. 741,730
2 Claims. (Cl. 260—527)

The present invention relates to the recovery of glutamic acid from sugar beet waste liquors. More particularly, it relates to a method for removing organic impurities from sugar beet waste liquors and for improving the crystallization of glutamic acid from hydrolyzates thereof.

Sugar beet waste liquors are complex mixtures of organic and inorganic materials, and because of their complexity, they present numerous problems in the recovery of glutamic acid therefrom. It is necessary in every case to subject the waste liquor to some form of hydrolysis to convert the glutamic acid precursor compounds therein into glutamic acid. For this purpose, alkaline-hydrolysis is distinctly preferred. It is then necessary to acidify the hydrolyzate to a pH around the neutral range, and then to concentrate the liquor and crystallize a substantial portion of the inorganic salts therefrom. It then becomes feasible to acidify the liquor to around pH 3.2 and to crystallize glutamic acid therefrom. In many cases, however, the waste liquor contains organic impurities of unascertained nature which tend to interfere with the glutamic acid crystallization, and it is desirable to remove such impurities at some point prior to glutamic acid crystallization.

The present invention is a method for simultaneously purifying thin barium filtrate and concentrated Steffen's filtrate and for hydrolyzing the glutamic acid mother substances therein.

An object of the present invention is to provide an improved and more economical process for recovering glutamic acid from sugar beet waste liquors.

Another object is to remove organic impurities from sugar beet waste liquors prior to crystallization of glutamic acid therefrom.

Another object is to provide a more economical means for hydrolyzing sugar beet waste liquors.

A further object is to more fully utilize the barium content of thin barium filtrate.

Other objects of the invention will be apparent from the present description and claims.

Thin barium filtrate is an aqueous solution of around 18° Brix containing about 20% by weight of dissolved solids, including barium compounds equivalent to around 20–50 grams of BaO per liter, sodium compounds, sugar and other carbohydrates, organic acids, and nitrogeneous substances, including glutamic acid and glutamic acid mother substances, in particular pyrrolidonecarboxylic acid. It is known that barium hydroxide is capable of hydrolyzing glutamic acid mother substances (Hoglan U.S. Patent 2,713,592, July 19, 1955) and that soluble barium compounds are capable of precipitating organic impurities (Purvis-Fike U.S. Patent 2,796,433, June 18, 1957). In thin barium filtrate, however, the solids content is too low for the barium to effect any removal of the organic impurities, and in many cases the pH is too low for the barium to act as an effective hydrolytic agent. Concentrating the thin barium filtrate has been proposed (Hoglan U.S. Patent 2,799,704, July 16, 1957) as a means for improving the autohydrolysis of the glutamic acid mother substances, but this leads to serious problems of scaling and diminished heat transfer in the concentration vessel. Thus it has not heretofore been feasible to make adequate use of the barium content of thin barium filtrate.

In the present invention, these difficulties are overcome by blending thin barium filtrate with concentrated Steffen's filtrate in a proportion to produce a mixture containing greater than 25% solids, dry basis, and having a pH above about 9. In this way, the solids content for the barium to be effective in removing organic impurities is achieved without concentrating the thin barium filtrate; the barium is maintained in a form effective for hydrolysis; and the resulting mixture has a pH which is effective both for removing organic impurities and for hydrolyzing the glutamic acid precursor compounds. Either before or after hydrolysis, the organic impurities are readily separated from the mixed filtrates in the form of barium compounds or complexes of unascertained structure.

The invention thus employs both thin barium filtrate and concentrated Steffen's filtrate. The latter is obtained from thin Steffen's filtrate, which is the residual solution remaining after the precipitation of sugar from beet sugar molasses as calcium saccharate. Thin Steffen's filtrate contains only about 3% of dissolved solids, including calcium compounds but essentially no barium compounds. In other respects it closely resembles thin barium filtrate. Thin Steffen's filtrate is ordinarily carbonated to precipitate calcium therefrom in the form of calcium carbonate, which is filtered off. The remaining liquor is concentrated to a solids content between about 45 and about 65% by weight, ordinarily around 60%. This is the "concentrated Steffen's filtrate" of commerce. It generally contains a sufficient quantity of alkaline sodium and potassium compounds to have a pH between about 9 and about 12.

In one embodiment of the present invention, thin barium filtrate is commingled with concentrated Steffen's filtrate in a proportion to produce a mixture containing greater than 25% solids, dry basis, and having a pH above about 9. The resulting mixture is heated to a temperature between about 60 and about 100° C. for a period of about 1 to about 24 hours. Under these conditions, the glutamic acid precursor compounds contained therein are hydrolyzed substantially completely into glutamic acid, while organic impurities are precipitated in association with barium. These impurities are segregated from the liquid phase by filtration or the like. The filtrate is treated with carbon dioxide and filtered to remove the remaining barium. The purified filtrate is acidified to about pH 5–7, preferably with sulfuric acid, concentrated to precipitate inorganic salts, and filtered, and further acidified to pH 3.2 for crystallization of glutamic acid therefrom. As a result of this procedure, the crystallization of glutamic acid is materially improved.

By operating in the foregoing manner, the barium content of the thin barium filtrate is advantageously employed to serve a double function—viz., to hydrolyze glutamic acid precursor compounds and to separate organic impurities from the process stream. Such usage of barium is especially advantageous because in the thin barium filtrate alone it cannot serve to separate organic impurities, and in many cases it is incapable of effecting complete hydrolysis of the glutamic acid mother substances therein.

In another embodiment of the invention, thin barium filtrate is combined with concentrated Steffen's filtrate as described, the mixture is heated to effect hydrolysis of the glutamic acid mother substances, and the hydrolyzate is immediately treated with carbon dioxide, sodium carbonate, or the like to precipitate the dissolved barium compounds. In this way, all of the barium values, including the barium content of the precipitated organic impurities, can be filtered off simultaneously, and can be treated for regeneration of barium oxide in a form suitable for recycle.

The barium-containing precipitate of organic impurities obtained in the present invention is soluble to a considerable extent in water. Hence, if the precipitate is washed with water to remove entrained glutamic acid values, the wash liquor picks up a quantity of the organic impurities, and for this reason must not be added to the purified mixture of sugar beet waste liquors. Instead, the wash liquor can be recycled by admixture with a fresh quantity of thin barium filtrate and concentrated Steffen's filtrate, whereby the organic impurities will again be precipitated. By operating in this manner, the organic impurities are recycled to some extent, but not in a proportion sufficient to build up within the process stream. At the same time, glutamic acid values are recovered in large measure from the precipitated organic impurities.

In a preferred embodiment of the invention, thin barium filtrate and concentrated Steffen's filtrate are commingled in proportions to produce a mixture having a solids content above about 40% by weight. The resulting mixture will ordinarily have a pH between about 9.5 and about 12. If desired, particularly where the pH of the mixture is below 11, a small additional proportion of sodium hydroxide, potassium hydroxide, barium hydroxide, or other strong inorganic base can be added to raise the pH above about 11 in order to facilitate hydrolysis. The mixture is then heated at about 85° C. for about 4 hours, under which conditions glutamic acid precursor compounds therein are substantially completely hydrolyzed. The hydrolyzate, containing precipitated organic impurities in association with barium, is treated with sulfuric acid or other suitable agent, preferably carbon dioxide, to precipitate the dissolved barium and calcium values, and the solid matter is filtered off. The solids are washed with water, and the wash liquor is recycled to further treatment in combination with a fresh quantity of thin barium filtrate and concentrated Steffen's filtrate. The purified hydrolyzate is adjusted to a pH around 5 to 7, concentrated to effect crystallization of a substantial proportion of the inorganic salts contained therein, filtered to remove the salts, acidified to around pH 3.2, and allowed to stand with gentle stirring to permit glutamic acid to crystallize therefrom. By operating in accordance with the procedure described above, the crystallization of glutamic acid is substantially accelerated and the yield of glutamic acid is materially increased.

The following specific example will more clearly illustrate the invention.

*Example*

Concentrated Steffen's filtrate (100 parts by weight) having a solids content of about 60% and a pH of about 10 is commingled with thin barium filtrate (100 parts by weight) having a solids content of about 20% and a pH around 13. The resulting mixture, having a solids content of about 40% and a pH above 11, is heated to 85° C. and maintained at this temperature for about 4 hours, during which time hydrolysis of the glutamic acid precursor compounds reaches substantial completion. The hydrolyzate is filtered and the resulting cake, weighing 9.8 parts and comprising barium and organic matter, is rejected from the process. The filtrate is treated with carbon dioxide for 15 minutes, and the precipitate of barium carbonate is filtered off. The barium-depleted filtrate is adjusted to pH 6.5 with 10 parts of 50% sulfuric acid, concentrated to 115 parts, then filtered to remove inorganic salts therefrom. The salts, weighing 20 parts, are discarded. The filtrate is further acidified to pH 3.2 with 10 parts of 50% sulfuric acid, and is cooled to around 20° C. and stirred gently for a period of 24 hours, during which time glutamic acid crystallizes therefrom. The resulting slurry is filtered, and a cake containing 7.2 parts by weight of glutamic acid is recovered. The end liquor weighs about 72 parts and contains about 1.3 parts of glutamic acid.

While the invention has been described with reference to a number of specific processing details, it is to be understood that such matters are illustrative only and not by way of limitation. Numerous modifications and equivalents of the invention will be apparent to those skilled in the art from the foregoing description.

The following claims particularly specify and distinctly claim the subject matter of the invention:

1. In a process for recovering glutamic acid from sugar beet waste liquors, the improvement of commingling thin barium filtrate with concentrated Steffen's filtrate and a strong base in a proportion to produce a mixture containing greater than 40% solids, dry basis, and having a pH above about 11, heating the resulting mixture to a temperature effective to hydrolyze the glutamic acid precursor compounds therein, whereby organic impurities therein are precipitated in association with barium, and segregating the precipitated material from the resulting hydrolyzate, whereby the recovery of glutamic acid values from said hydrolyzate is facilitated.

2. The process of claim 1 wherein said strong base is sodium hydroxide.

References Cited in the file of this patent

UNITED STATES PATENTS

| | | |
|---|---|---|
| 2,796,433 | Purvis et al. | June 18, 1957 |
| 2,799,704 | Heglan | July 16, 1957 |